(12) United States Patent
Crippa et al.

(10) Patent No.: US 8,701,841 B2
(45) Date of Patent: Apr. 22, 2014

(54) CALIPER BODY OF A DISC BRAKE (75) Inventors: Cristian Crippa, Città (IT); Paolo Cesani, Bergamo (IT); Massimo Preda, Bergamo (IT)

(73) Assignee: Freni Brembo S.p.A., Curno (BG) (IT)

( * ) Notice: Subject to any disclaimer, the term of this patent is extended or adjusted under 35 U.S.C. 154(b) by 0 days.

(21) Appl. No.: 13/518,442

(22) PCT Filed: Dec. 24, 2010

(86) PCT No.: PCT/IT2010/000514
§ 371 (c)(1),
(2), (4) Date: Oct. 11, 2012

(87) PCT Pub. No.: WO2011/077471
PCT Pub. Date: Jun. 30, 2011

(65) Prior Publication Data
US 2013/0020155 A1  Jan. 24, 2013

(30) Foreign Application Priority Data

Dec. 24, 2009  (IT) ............................... MI2009A2297

(51) Int. Cl.
*F16D 55/228*  (2006.01)

(52) U.S. Cl.
USPC ................. 188/73.47; 188/73.31; 188/370

(58) Field of Classification Search
USPC .............. 188/71.1, 72.1, 72.4, 73.31, 73.46, 188/73.47, 370; D12/180
See application file for complete search history.

(56) References Cited

U.S. PATENT DOCUMENTS

| 5,343,985 | A | * | 9/1994 | Thiel et al. | 188/72.5 |
| 5,464,077 | A | * | 11/1995 | Thiel et al. | 188/72.5 |
| 6,708,802 | B2 | | 3/2004 | Stahl et al. | |
| D555,555 | S | * | 11/2007 | Ikuzawa et al. | D12/180 |
| D623,102 | S | * | 9/2010 | Gherardi et al. | D12/180 |
| 7,815,022 | B2 | * | 10/2010 | Aydt et al. | 188/73.1 |
| 7,950,504 | B2 | * | 5/2011 | Nanri et al. | 188/72.4 |

FOREIGN PATENT DOCUMENTS

| EP | 1826448 A1 | 8/2007 |
| EP | 1911989 A1 | 4/2008 |
| WO | WO2005078306 A1 | 8/2005 |
| WO | 2007094017 A1 | 8/2007 |

* cited by examiner

*Primary Examiner* — Thomas J Williams
(74) *Attorney, Agent, or Firm* — Robert E. Alderson, Jr.

(57) ABSTRACT

Brake caliper bodies and brake calipers for disc brakes are provided.

16 Claims, 11 Drawing Sheets

CALIPER BODY OF A DISC BRAKE

CROSS-REFERENCE TO RELATED APPLICATIONS

This application is a National Phase Application of PCT International Application No. PCT/IT2010/000514, International Filing Date, 24 Dec. 2010, claiming priority to Italian Patent Application No. MI2009A002297, filed 24 Dec. 2009, both of which are hereby incorporated by reference in their entirety.

FIELD OF THE INVENTION

The present invention refers to a caliper body for a disc brake, for example for a motor vehicle, as well as to a caliper for a disc brake that comprises such a body.

In particular, in a disc brake, the brake caliper is arranged astride of the outer peripheral edge of a brake disc. The brake caliper usually comprises a body having two elongated elements that are arranged so as to face opposite braking surfaces of a disc. Friction pads are foreseen arranged between each elongated element of the caliper and the braking surface of the brake disc. At least one of the elongated elements of the body of the caliper has cylinders suitable for receiving hydraulic pistons capable of exerting a thrusting action on the pads abutting them against the braking surfaces of the disc to exert a braking action on the vehicle.

BACKGROUND OF THE INVENTION

The brake calipers are usually fixedly connected to a support structure that stays still with respect to the disc, like for example a spindle of a vehicle's suspension.

In a typical arrangement, one of the two elongated elements has two or more portions for attaching the body of the caliper to the support structure, for example by foreseeing slots or eyelets, for example arranged axially, or through holes, for example arranged radially, suitable for receiving screws for fixing the caliper that, with their ends are received in threaded holes foreseen on the support of the caliper.

In a typical caliper body construction, the elongated elements arranged facing the braking surfaces of the disc are connected together by bridge elements arranged astride of the disc.

The caliper comprises different components mounted on the body such as the pistons, gaskets, bleeding devices and brake fluid supply ducts.

Typically, the body of the caliper is made from metal, like for example aluminium, aluminium alloy or steel. The body of the caliper can be obtained by casting, but also by mechanical chip-removal processing, as well as by forging.

The body of the caliper can be produced both in a single piece or enbloc, and also in two half-calipers typically connected together along a plane that usually coincides with the middle plane of the disc on which the caliper is arranged astride.

In the case in which the driver of the vehicle wishes to brake or slow down the speed of the vehicle, he applies a pressure on the brake pedal, in the case of an automobile. Such pressure on the brake pedal, through a brake pump, exerts a pressure of the brake fluid that through a duct applies to the brake fluid present in the hydraulic circuit arranged inside the body of the caliper until it reaches the cylinders where the pressure is exerted on the surface of the bottom of the pistons forcing them to clamp against the pads, which in turn abut against the braking surfaces of the disc.

The pressure action of the brake fluid also acts on the bottom wall of the cylinder causing a reaction in the body of the caliper that deforms it away from the surfaces of the disc. This deformation of the body of the caliper leads to an increase in the stroke of the pistons and thus to an increase in the stroke of the brake pedal.

The body of the caliper also deforms as a function of the torque exerted by the action of the pistons that abut the pads against the braking surfaces of the disc applied in directions that form torque arms with respect to the attachment points of the caliper body to its support. These torques deform the caliper body also in a tangential and radial direction with respect to the disc, as well as in the axial direction.

The caliper body must therefore have a sufficient structural rigidity, so as to ensure that this deformation of the body of the caliper caused by the braking action is kept within tolerable values, which, as well as avoiding damage to the braking system, do not give the driver the feeling that the braking system is spongy, determining an extra stroke of the lever or pedal of the braking system creating the feeling of a spongy braking system. This requirement pushes towards having extremely rigid structures for the bodies of the calipers and thus towards increasing their bulk and weight.

On the other hand, the body of the caliper, since it is fixedly connected to the vehicle's suspension and is arranged astride of the disc, is one of the non-suspended masses that it is wished to reduce as much as possible to increase the performance of the vehicle.

Of course, these considerations are pushed to the extreme when the vehicle is for racing and the user wants to have a braking system that is extremely responsive to his commands and at the same time extremely light so as not to penalize the performance of the racing vehicle.

There is therefore a need for a caliper body for a disc brake that has improved structural characteristics for the same weight of the body of the caliper, or else that has a lower weight with respect to the solutions of the prior art for the same structural characteristics.

Solutions of caliper bodies are known that are specially researched to increase the characteristics of structural rigidity. For example, patent application EP-A-2022999, patent application EP-A-153497, American patent U.S. Pat. No. 6,708,802, European patent EP-A-1911989, international patent application PCT/EP2005/050615, Japanese patent application JP-A-09257063 and American patent U.S. Pat. No. 3,183,999 all have solutions of brake caliper bodies equipped with reinforcing elements, for example arranged around the caliper bodies. In some of these known solutions the caliper body is of the symmetrical type according to planes passing through the axis of the disc or through the middle of the disc. In other solutions the caliper body has big and distributed windows, also passing right through, which form elongated reinforcing elements arranged longitudinally to the body of the caliper.

Although satisfactory from many points of view, these known solutions nevertheless do not make it possible to obtain structures that maximize the structural rigidity of the body of the caliper reducing weights and at the same time capable of keeping the bulk as low as possible so as to make it easier to mount the body of the caliper even inside the rim and wheel on which brake discs having a large diameter are mounted.

SUMMARY OF THE INVENTION

These and further purposes are accomplished through a caliper body as described herein.

Further purposes, solutions and advantages are present in the embodiments described hereafter and claimed in the dependent claims attached hereto.

Different embodiments of the invention will now be described hereafter through example embodiments given just as examples and not for limiting purposes, with reference in particular to the attached figures in which:

DETAILED DESCRIPTION

In accordance with a general embodiment, some examples of which are depicted in the attached figures, a caliper body 1 for a disc brake is suitable for being arranged astride of a disc 40 for a disc brake.

Said disc 40 has a first braking surface 41 and a second braking surface 42, opposite the first braking surface.

The disc 40 defines an axial direction, indicated in the figures with the line A-A, parallel to a rotation axis thereof, indicated in the figures with a-a, as well as a tangential or circumferential direction, indicated in the figures with T-T and parallel to one of its braking surfaces 41, 42. When this circumferential direction is followed in the same direction as the rotation of the disc, a disc entry travel direction is defined, indicated in the figures with reference letter "I", as well as an opposite disc exit direction indicated in the figures or in reference letters "U".

Said disc 40 also defines a radial direction, indicated in the figures with R-R, arranged perpendicular to the axial direction A-A and to the circumferential or tangential direction T-T. For the radial direction it is also possible to define an outer radial direction RO when this direction is followed going away from the rotation axis of the disc a-a.

The caliper body 1 comprises an attachment side (or mounting side) elongated portion 2, joined with at least one attachment portion 12, for example, but not necessarily, a portion defining a through hole suitable for receiving attachment means of the caliper body to a support structure of the caliper body, for example a spindle of a vehicle's suspension.

Said attachment side elongated portion 2 comprises a disc entry side first tangential end 21 and a disc exit side second tangential end 22.

Said attachment side elongated portion 2 has an axial inner surface thereof 13 suitable for facing the first braking surface 41 of the disc 40.

Said attachment side elongated portion 2 houses, or else forms, at least one cylinder 15 suitable for receiving a piston to exert a pressure on a pad 8 arranged, or housed, between said elongated attachment portion 2 and said braking surface 41 of the disc 40.

Said caliper body 1 also comprises a non-attachment side (or non mounting side) elongated portion 3. Said non-attachment side elongated portion 3 has an axial inner surface 14 suitable for facing the second braking surface 42 of the disc 40.

Said non-attachment side elongated portion has a disc entry side first tangential end 23 and a disc exit side second tangential end 24.

Said non-attachment side elongated portion 3 houses, or forms, at least one cylinder 15 suitable for receiving a piston to exert a pressure on a pad 9 housed between said non-attachment side elongated portion 3 of the caliper 39 and said braking surface 42 of the disc 40.

Said elongated portions 2, 3 are connected together by a first end bridge 4 that connects the two disc entry side tangential ends 21, 23 of the elongated attachment portion 2 and of the elongated non-attachment portion 3. Advantageously, said bridge is suitable for being arranged astride of the disc 40. Said elongated portions 2, 3 are also connected together by a second end bridge 5 that connects them at the two disc exit side tangential ends 22, 24. Said second end bridge 5 is suitable for being arranged astride of the disc 40.

Preferably, said caliper body 1 also comprises two central bridges 6, 7 connecting the two elongated attachment 2 and non-attachment 3 portions in their regions arranged inside or between the two end bridges, or else inside the disc entry side first tangential end and of the disc exit side second end. Advantageously, each of said central bridges 6, 7 comprises radial or lateral surfaces 16, or surfaces that extend mainly in the radial direction R-R, facing and opposite one another, as well as radial or lateral surfaces 17, 18 opposite one another that face towards the end bridges 4, 5.

Preferably, said central bridges 6, 7 connect the attachment side elongated portion 2 to the non-attachment side elongated portion 3 and have the opposite lateral radial surfaces 17, 18 that, when going from the attachment side elongated portion 2 to the non-attachment side elongated portion 3, move apart like a "V".

In accordance with an embodiment, said central bridges connect the attachment side elongated portion 2 to the non-attachment side elongated portion 3 and have said opposite lateral radial surfaces 17, 18 facing towards the end bridges that, going from the attachment side elongated portion 2 to the non-attachment side elongated portion 3, move apart like a "V" and an acute angle is formed with respect to the same axial direction arranged between said two bridges.

Figure 11:
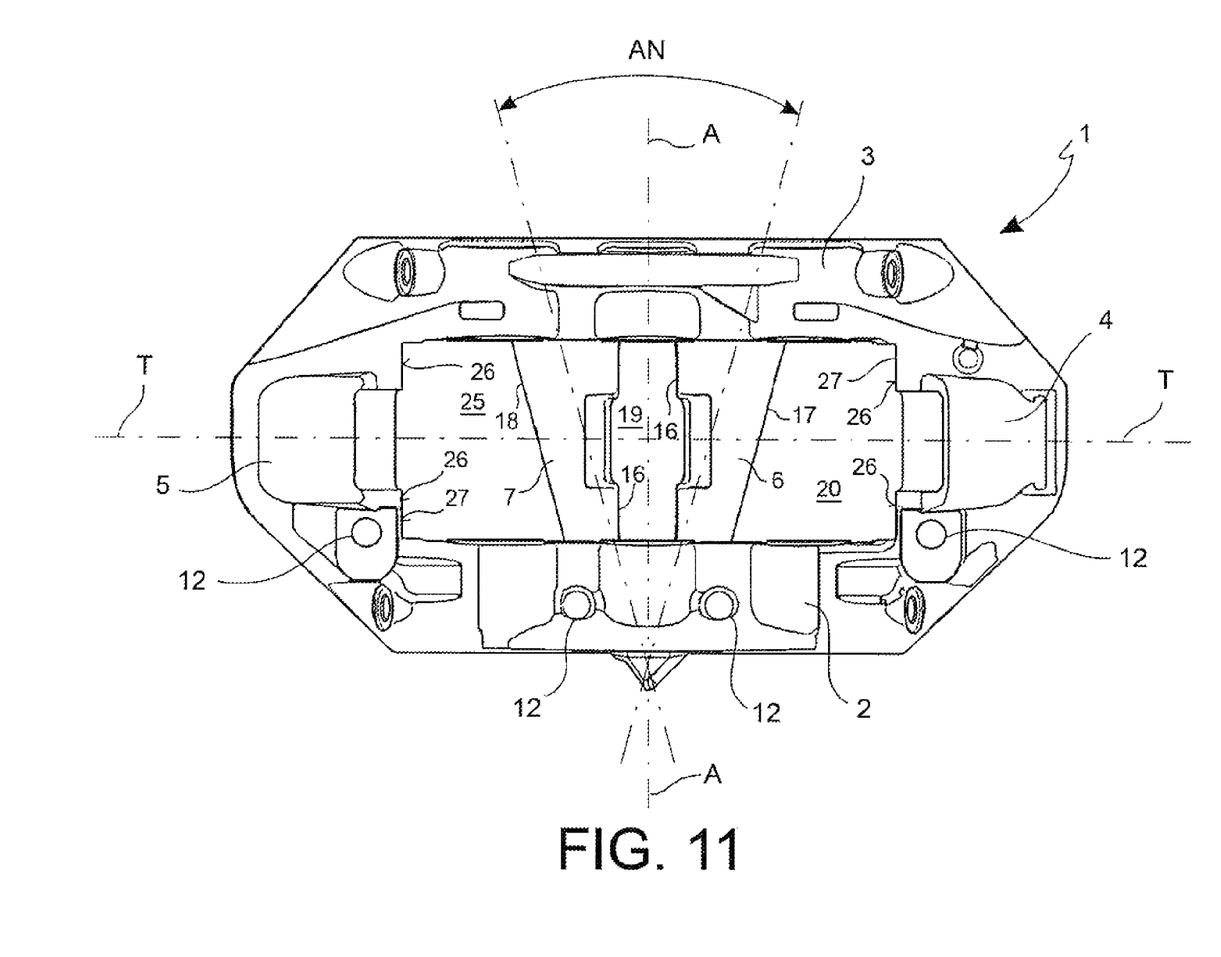
FIG. 11 represents a view from below or radially from the inside of the caliper body of FIG. 5 in which the inner surface of the body of the caliper or surface facing towards the axis of the disc is shown.

In accordance with an embodiment, said opposite surfaces diverge on opposite sides with respect to the axial direction A-A and, preferably they form a predetermined angle between them, indicated for example in FIG. 11 with reference mark "AN".

In accordance with an embodiment, viewing the caliper body in the radial direction from the axis of the disc outwards, said two central bridges 6, 7 connecting the two elongated portions 2, 3 join at said attachment side elongated portion converging, with their opposite lateral radial surfaces 17, 18 facing towards the end bridges, in a protuberance that extends axially outside of the caliper body beyond said attachment side elongated element 2.

In accordance with an embodiment, viewing the caliper body in the radial direction from the axis of the disc outwards, said two central bridges 6, 7 connecting the two elongated portions 2, 3 join said attachment side elongated portion at the sides of the same cylinder 15. In accordance with an embodiment, said two central bridges 6, 7 connecting the two elongated portions 2, 3 join said attachment side elongated portion between the same cylinder 15 and two attachment portions 12 close to said same cylinder 15.

In accordance with an embodiment, between said central bridges 6, 7 there is a central window 19 passing straight through that places the inside of the caliper 39 in communication in the radial direction R-R with the outside of the caliper.

In accordance with an embodiment, between said first central bridge 6 and the first end bridge 4 there is a first side window 20 that places the inside of the caliper in communication in the radial direction R-R with the outside of the caliper.

In accordance with an embodiment, between said second central bridge 7 and the second end bridge 5 there is a second side window 25 passing straight through that places the inside of the caliper in communication in the radial direction R-R with the outside of the caliper.

In accordance with an embodiment, said first and second central bridge 6, 7 connect to the attachment side elongated portion 2, substantially close to the middle of this attachment side elongated portion 2.

In accordance with an embodiment, the two central bridges 6, 7 project from the attachment side elongated portion 2, towards the non-attachment side elongated portion 3, starting out substantially connected together, or else, in accordance with an embodiment, detaching from the attachment side elongated portion 2 both from the same region that, for example, but not necessarily, is the central region of the attachment side elongated portion 2.

In accordance with an embodiment, between the two central bridges 6, 7 there is a central window 19 suitable for receiving an elastic element 10 to influence the pads 8, 9 going away from the disc 40 and abutting against an abutment surface 26 foreseen in the body of the caliper.

Figure 1:
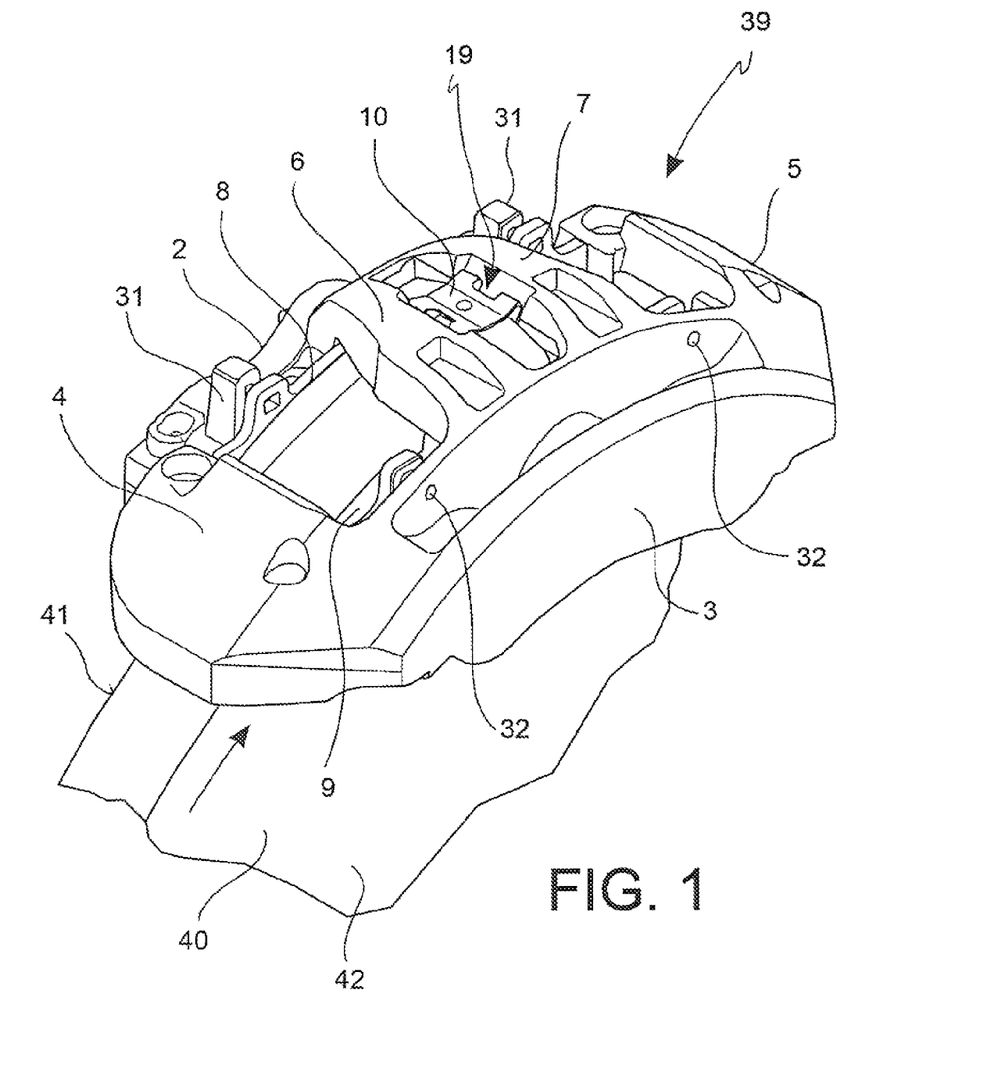
FIG. 1 shows an axonometric view of a caliper for a disc brake represented from above and the outer side of the vehicle, i.e. the side of the elongated portion not for attaching to the support of the caliper.
Figure 2:
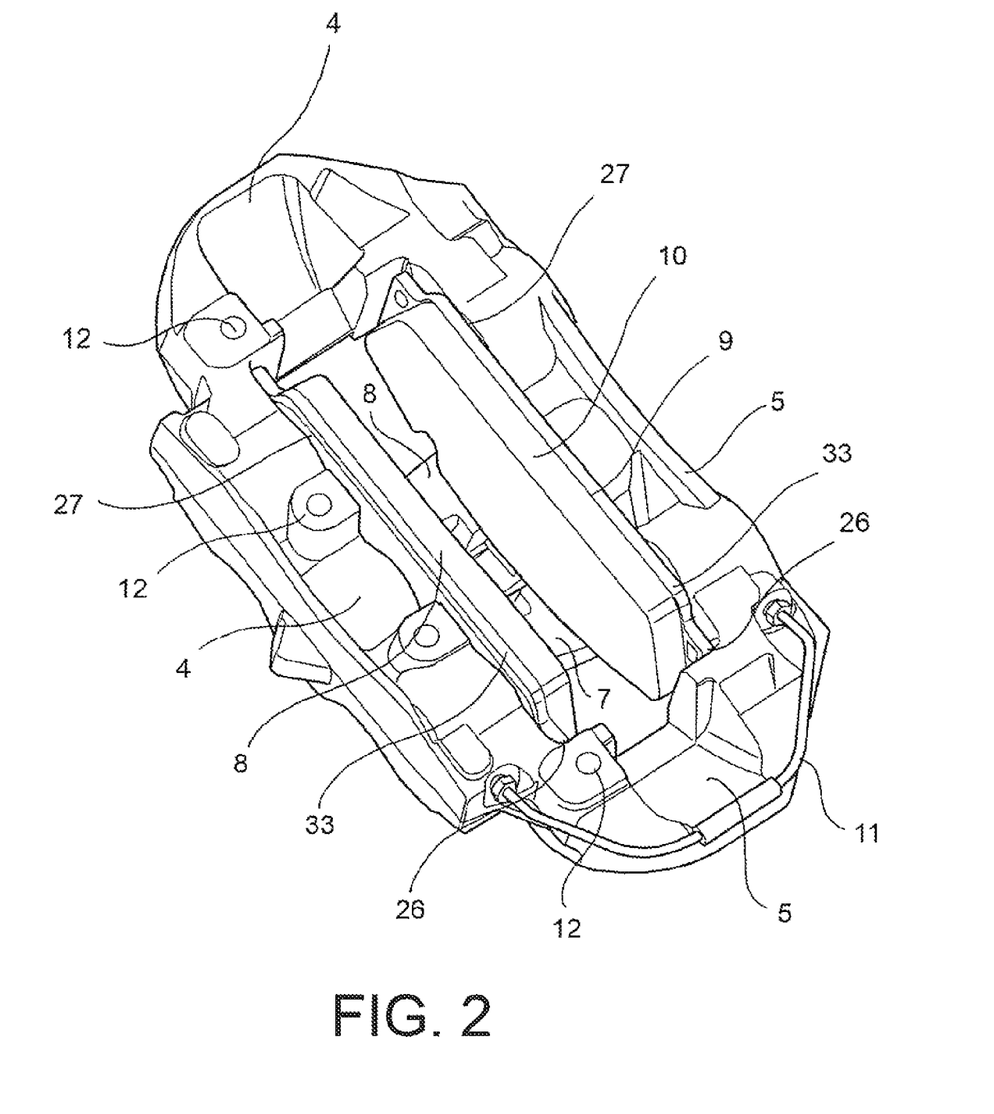
FIG. 2 shows an axonometric view from below and the side of the elongated portion for attaching to the support of the caliper of FIG. 1.
Figure 3:
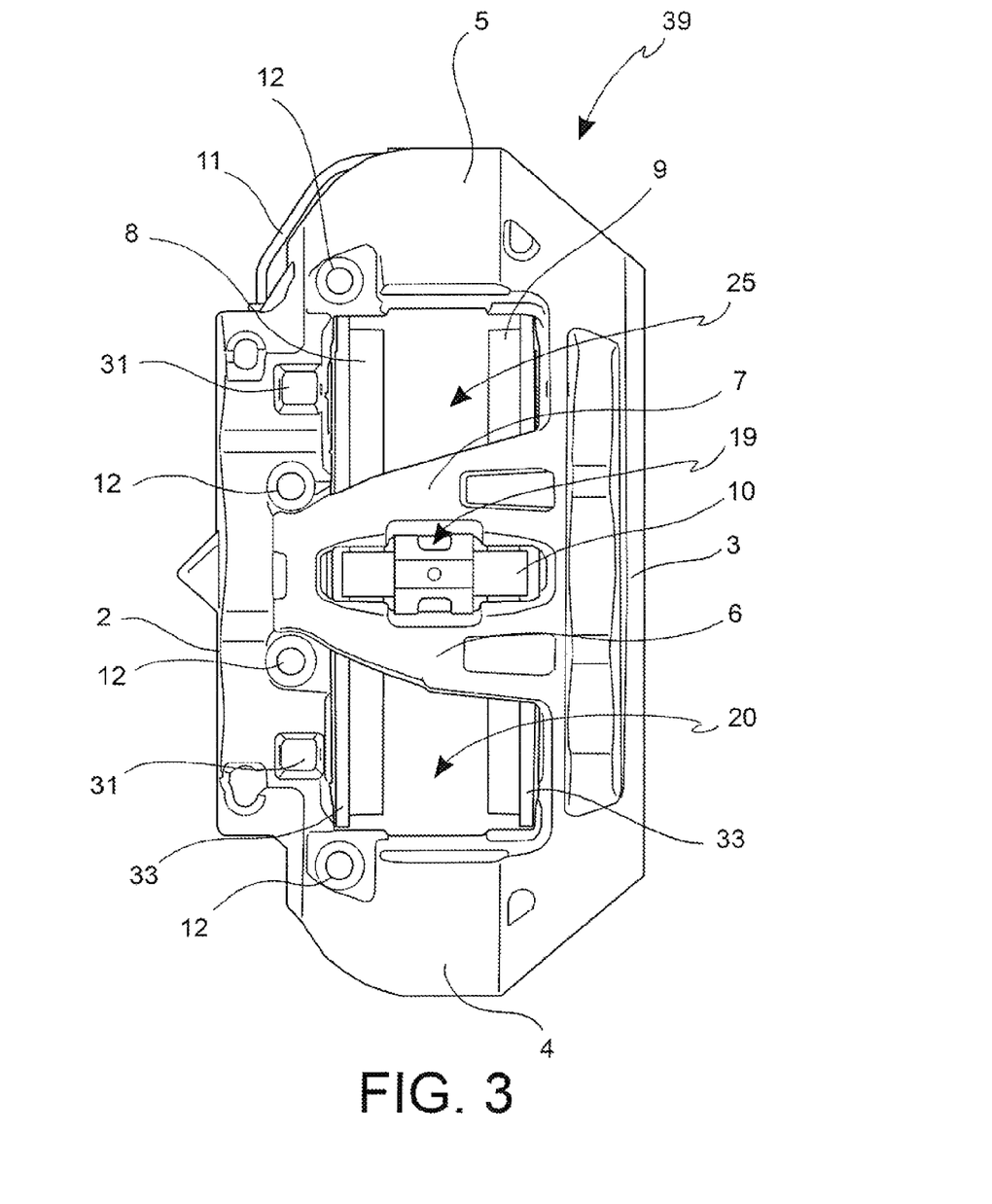
FIG. 3 illustrates a view from above, i.e. representing the radially outer surface facing the side opposite the disc, of the caliper of FIG. 1.
Figure 4:
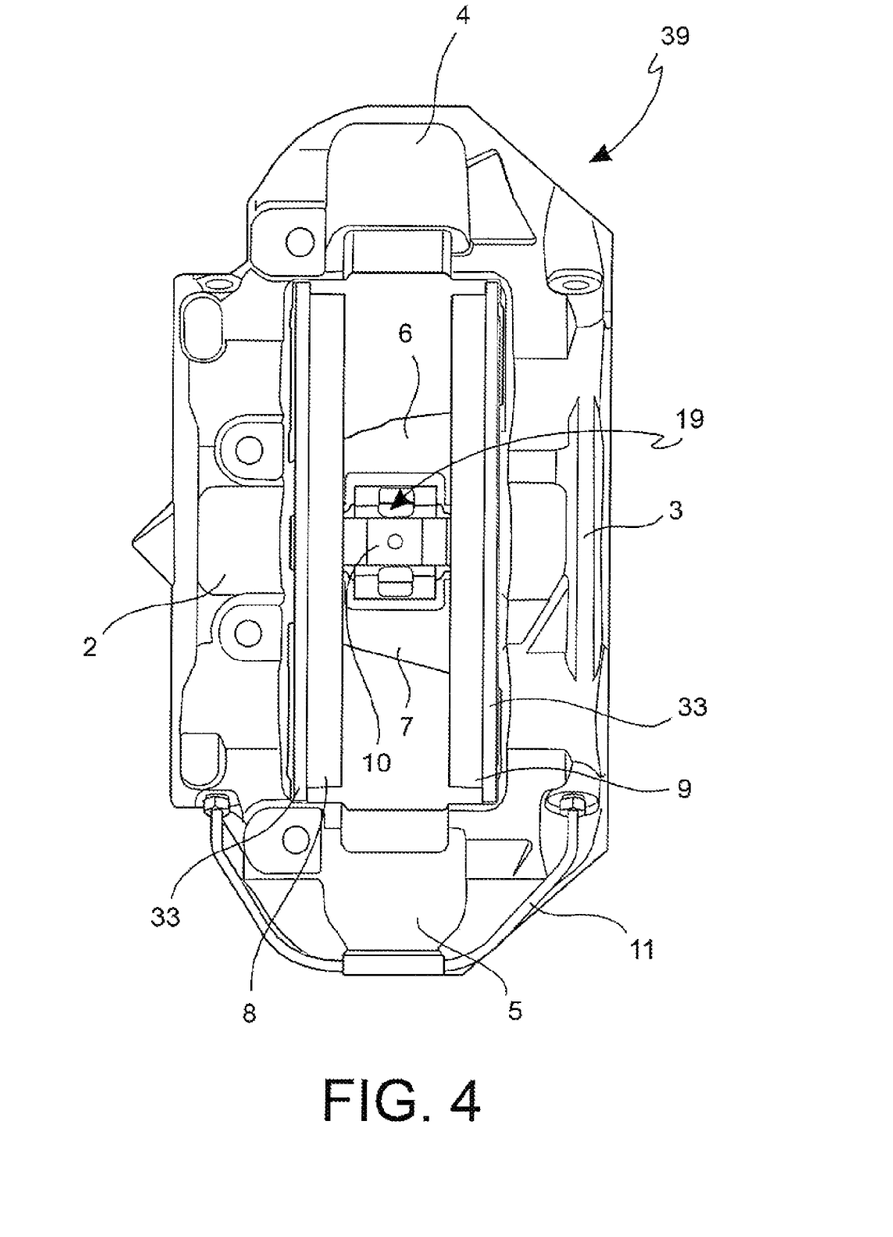
FIG. 4 represents a view from below, i.e. a view that shows the inner surface facing towards the axis
Figure 5:
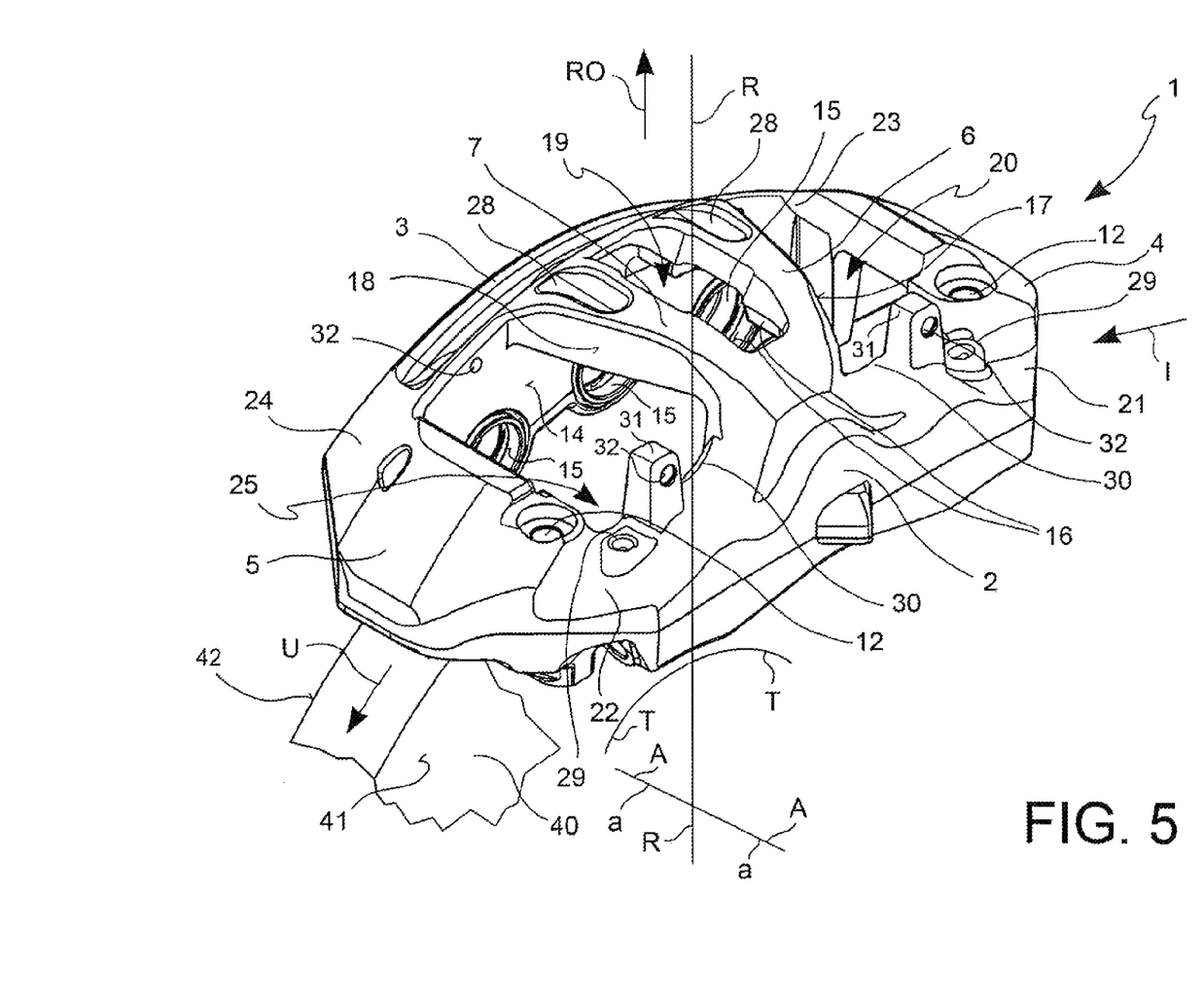
FIG. 5 represents an axonometric view from above on the side of the elongated portion for attaching to the support of a caliper body.
Figure 6:
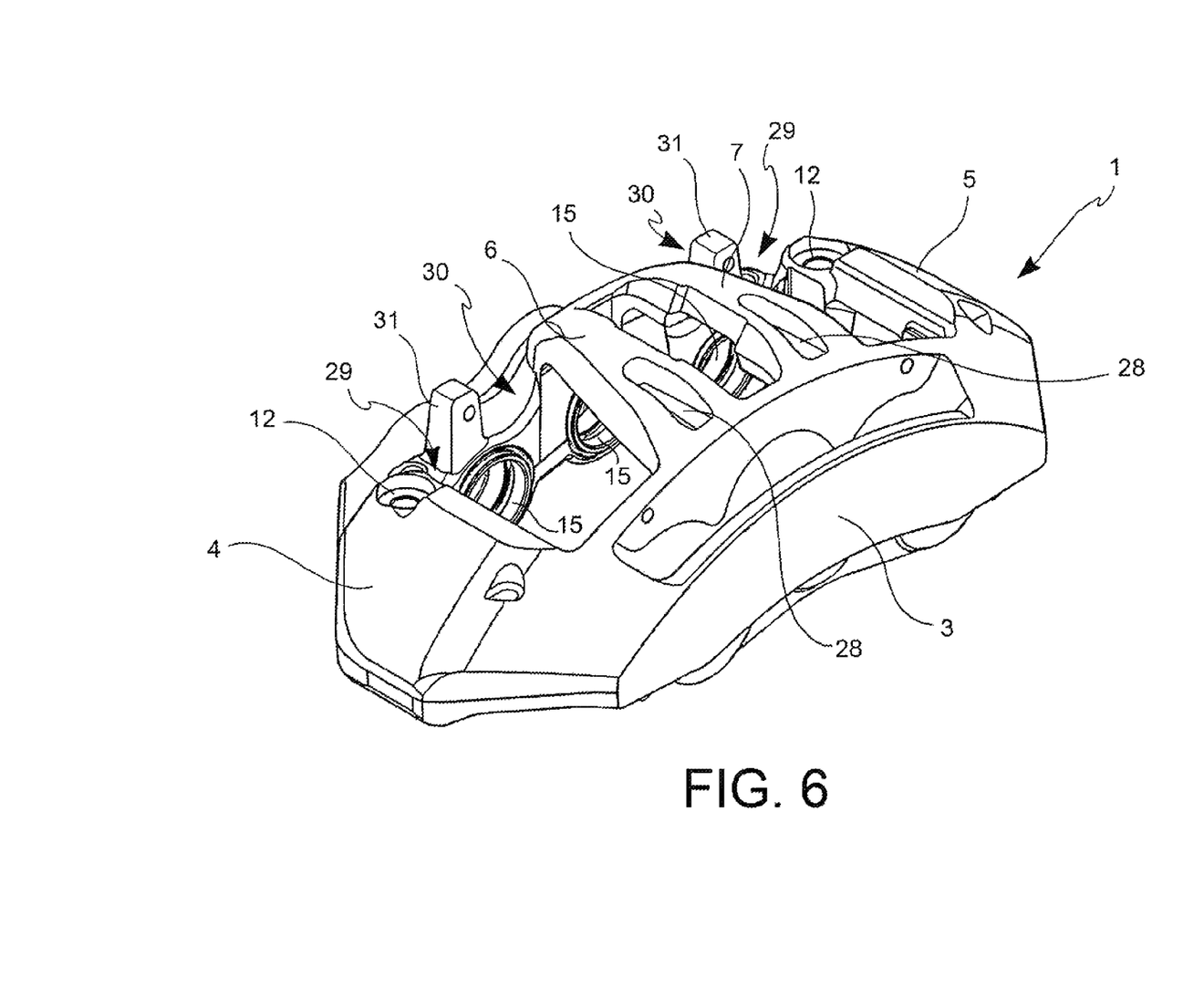
FIG. 6 represents an axonometric view from above, on the elongated side not for attaching to the support, of the caliper body of FIG. 5.
Figure 7:
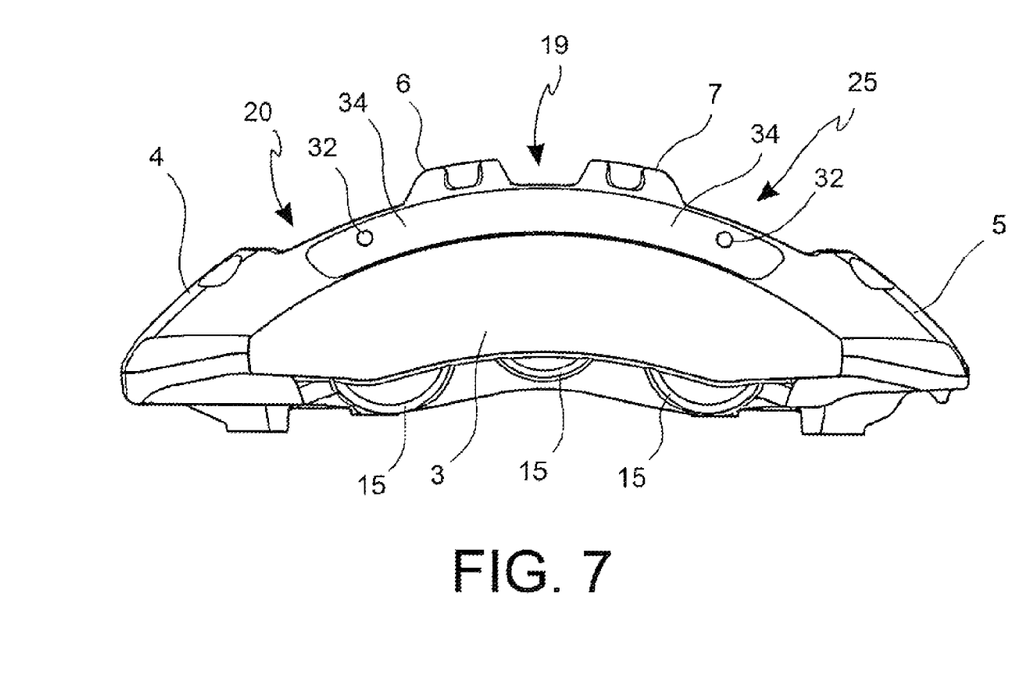
FIG. 7 represents the outer side view of the vehicle or axial view of the caliper of FIG. 5.

In accordance with an embodiment, the non-attachment side and attachment side elongated bodies 3, 2 together with the end bridges 4, 5 define pockets 27 suitable for receiving the pads 8, 9 so that they are arranged between the pistons housed in the cylinders 15 and the braking surfaces 41, 42 of the disc 40 (FIG. 2).

In accordance with an embodiment, the two central bridges 6, 7 have a surface facing towards the end bridges 4, 5 diverging apart, or else arranged so that, going from the attachment side elongated portion 4 to the non-attachment side elongated portion 5, said lateral surfaces 17, 18 move away from the axial direction A-A.

In accordance with an embodiment the thickness evaluated in the tangential direction T-T of the central bridges 6, 7 is variable along the longitudinal or axial direction A-A of said central bridges 6, 7. In accordance with an embodiment the inner surface of the central bridges 6, 7, indicated in the figures with reference numeral 16, extends passing from the attachment side elongated portion 2 to the non-attachment side elongated portion 3, substantially parallel to the axial direction A-A.

In accordance with an embodiment the inner surface of the central bridges 6, 7, or the opposite surfaces 16 of the central bridges move apart or diverge passing from the attachment side elongated portion 2 to the non-attachment side attachment portion 3, substantially like a "V".

In accordance with an embodiment, the inner surface or opposite surface of the two central bridges 6, 7, and the outer surface 17, 18 are for each bridge substantially parallel to one another and inclined with respect to the axial direction A-A.

In accordance with an embodiment, at least one of the central bridges 6, 7 has a portion thereof close to the non-attachment side elongated element 3 equipped with an undercut or groove 28 to make it lighter. In accordance with an embodiment both of the central bridges 6, 7 have a portion close to the non-attachment side elongated element 3 equipped with a groove 28, for example but not necessarily longitudinal, or pointing in the axial direction A-A, to make them lighter.

In accordance with an embodiment, the attachment side elongated portion 2 in radial direction R-R has at least one portion thereof depressed or, in other words, with lower radial thickness with respect to the radial thickness of said attachment side elongated portion 2, at the end bridge 4 or 5 and/or at the central bridges 6, 7.

In accordance with an embodiment, the attachment side elongated portion 4 has a longitudinal portion thereof extending according to the tangential direction T-T that is outside of the body of the caliper 1, or on the opposite side with respect to the disc 40, of low thickness or lower than the thickness at the attachment points between the attachment side elongated portion 2 and the end bridges 4, 5, as well as the central bridges 6, 7.

In accordance with an embodiment, the attachment side elongated portion 2, between at least one end bridge 4 or 5 and at least one central bridge 6 or 7, has at least two portions 29, 30 that are depressed or undercut forming portions of said attachment side elongated portion 2 with low thickness or lower than the radial thickness evaluated at said end bridge 4 or 5 and said central bridge 6 or 7.

In accordance with an embodiment, the attachment side elongated portion 2, between each end bridge 4 and 5 and the central bridges 6 and 7 facing the respective end bridge 4 and 5, has two depressed or undercut portions forming sections of the attachment side elongated portion 2 with lower radial thickness with respect to the radial thickness evaluated at said end bridges 4 and 5 and said central bridges 6 and 7.

In accordance with an embodiment, in said attachment side elongated portion 2, there is at least one window that opens in the axial direction A-A arranged between at least one end bridge 4 or 5 and the facing central bridge 6 or 7, said window placing the inside of the body of the caliper, or a plate 33 of the pad 8 in communication in the axial direction with the outside of the caliper.

In accordance with an embodiment, there are two of said axial windows in the section of the attachment side elongated element 2 foreseen between the end bridge 4 or 5 and the facing central bridge 6 or 7.

In accordance with an embodiment, between said undercuts 29 and 30, or else between said axial windows, there is a column-shaped element 31 that extends from said attachment side elongated portion 2 in the radial direction R-R towards the outside of the caliper, or towards RO.

In accordance with an embodiment, said column 31 has a seat 32 at its free end suitable for housing a pad support pin.

In accordance with an embodiment, said column-shaped element 31 extends from the attachment side elongated element 2 by an amount such as to take a seat 32 suitable for receiving a pad support pin into alignment with a corresponding seat 32, foreseen in the non-attachment side elongated element 3.

In accordance with an embodiment, the non-attachment side elongated element 3 has a radial thickness thereof that stays substantially constant along its entire longitudinal extension or parallel to the circumferential direction T-T.

In accordance with an embodiment, said non-attachment side elongated element 3 extends with a constant thickness forming an arc-of-circle shaped portion, from which, for example, but not necessarily, at the bottom, i.e. in its side facing towards the axis of the disc a-a, portions project at the cylinders 15 to house the pistons for biasing the pad 9.

In accordance with an embodiment, the non-attachment side elongated portion 3 has its portion axially facing the section of the attachment side elongated portion 2 that is equipped with at least one undercut or axial window, a section having a greater thickness in radial direction with respect to the radial thickness of the facing undercut section foreseen in the attachment side elongated portion 2.

Figure 8:
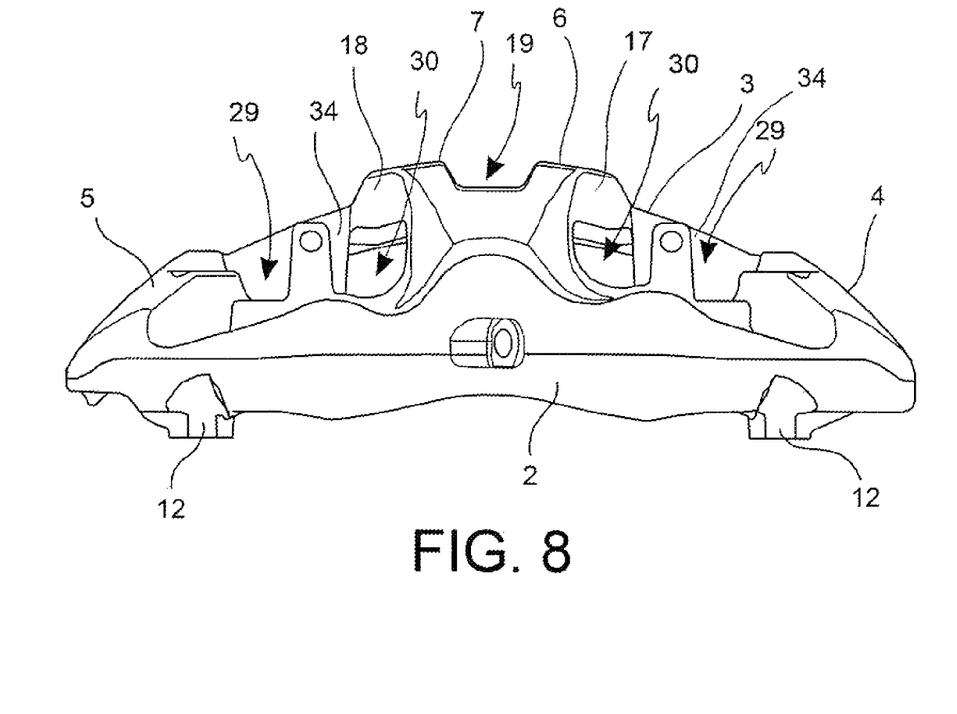
FIG. 8 represents a side view from the inner or inner axial side of the vehicle, of the caliper of FIG. 5.
Figure 9:
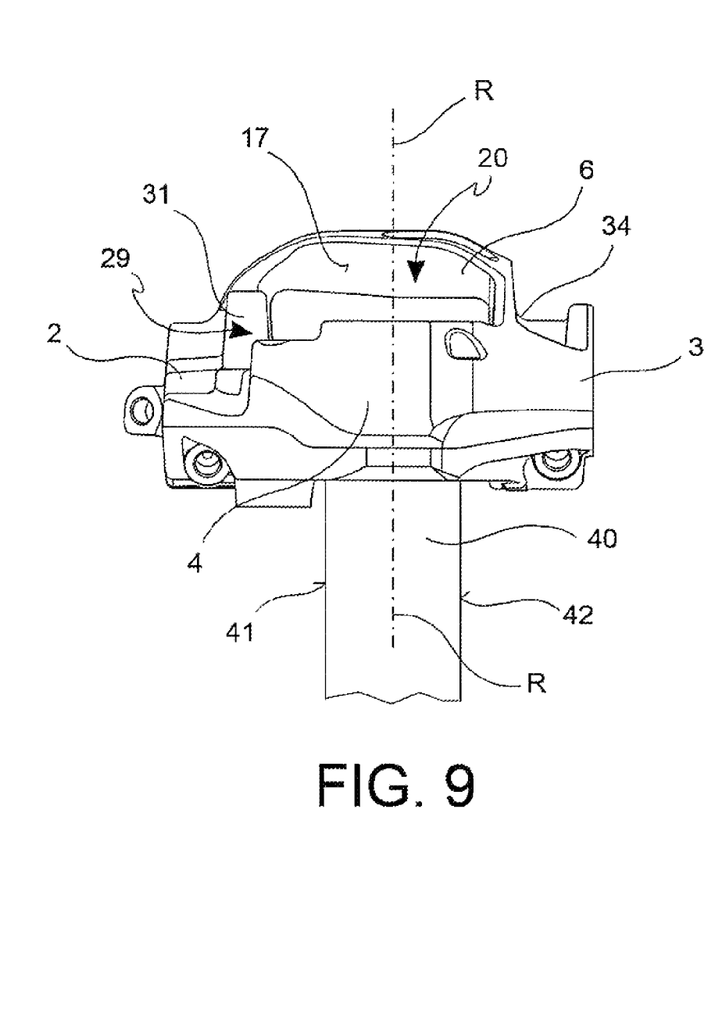
FIG. 9 represents a side or tangential or circumferential view of the caliper body of FIG. 5 in which the left portion of the figure represents the elongated portion on the side for attaching to the support of the caliper body.
Figure 10:
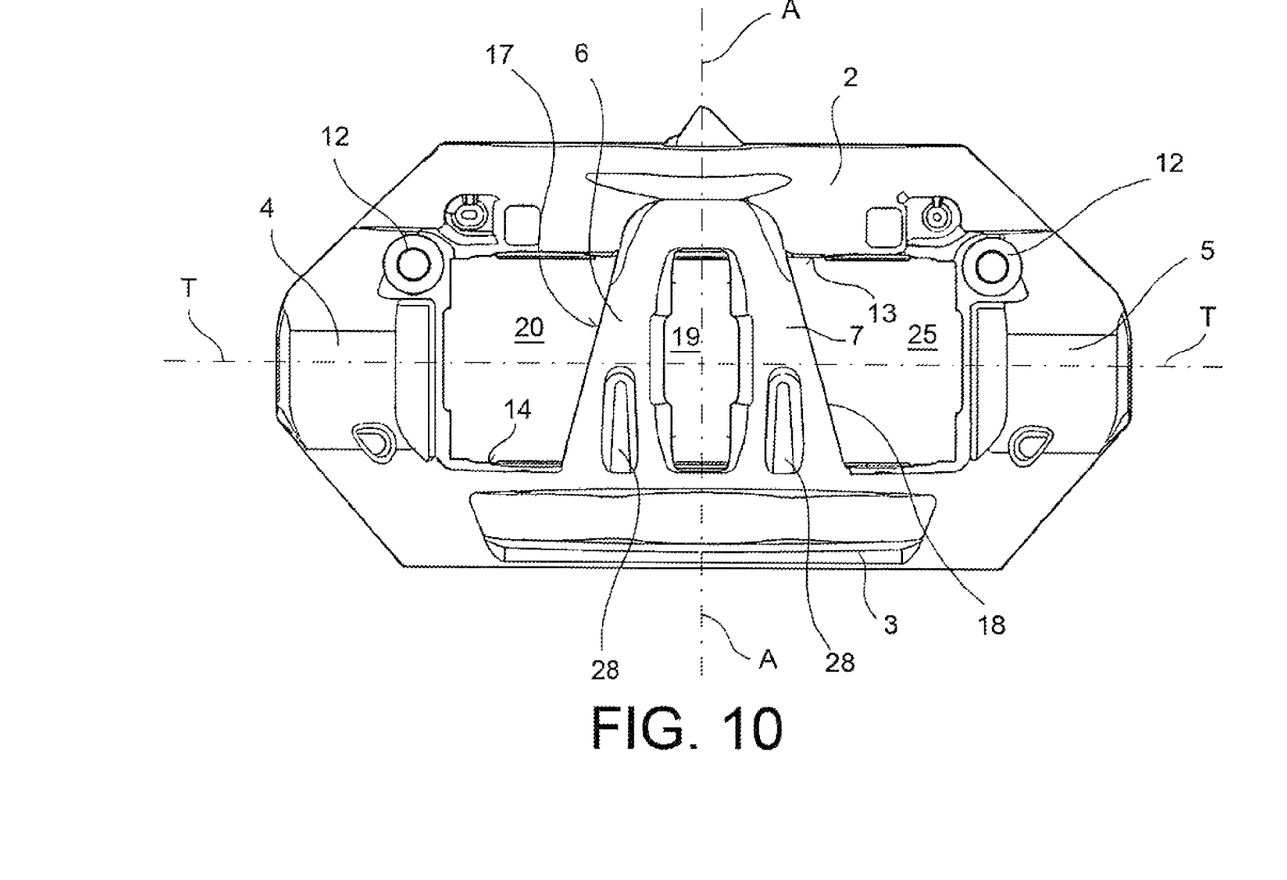
FIG. 10 represents a view from above or radially from the outside of the caliper body of FIG. 5 in which the outer surface of the body of the caliper opposite the axis of the disc is represented.

In accordance with an embodiment, axially facing every undercut portion or axial window of the attachment side elongated portion 2, there is a portion of greater radial thickness of the non-attachment side elongated portion 3, where said portion of greater thickness of the non-attachment side elongated portion 3 is indicated for example in FIG. 8 with reference numeral 34.

In accordance with an embodiment, the attachment side elongated portion 2 has an upper surface thereof facing radially outwards with respect to the axis of the disc a-a, which is shaped following the profile of the cylinders 15 that are made in it, for example forming recessed and projecting loops, for example extending roughly sinusoidally.

In accordance with an embodiment, the attachment side elongated portion 2 has a lower surface thereof facing radially inwards towards the axis of the disc a-a, shaped following the profile of the cylinders that are made in it, for example forming recessed and projecting loops, for example extending roughly sinusoidally.

In accordance with an embodiment the attachment portions 12 foreseen in the attachment side elongated portion 2 of the caliper 39 are two in number, or, alternatively, but not necessarily, four in number, where two of said four attachment portions 12 are preferably, but not necessarily arranged close to the central bridges.

Thanks to the fact that the attachment portions 12 are foreseen, in accordance with an embodiment, near to the end bridges 4, 5 and/or close to the central bridges 6, 7 all of the stresses coming from the non-attachment side elongated portion 3 are transferred to the support of the caliper passing through the end bridges 4 and 5, and, advantageously, the central bridges 6 and 7 shaped like a "V" coming together directly through the attachment portions 12 at the connection means and at the support of the caliper, limiting the deformation of the body of the caliper 1.

In accordance with an embodiment, said non-attachment side elongated portion 3 has a radially upper surface facing in the outer radial direction going away from the axis of the disc a-a equipped with a longitudinal groove, or longitudinal undercut extending in the tangential direction T-T, the bottom wall of which is shaped so as to follow the extension of the cylinders 15 foreseen in said non-attachment side elongated portion 3, for example forming recessed and projecting loops, for example with roughly sinusoidal extension.

In accordance with an embodiment, said non-attachment side elongated portion 3 has an inner radial surface facing towards the axis of the disc a-a, shaped so as to follow the profile of the cylinders 15, foreseen in said non-attachment side elongated portion 3, for example forming recessed and projecting loops, for example with roughly sinusoidal extension.

In accordance with an embodiment, said attachment side elongated portion 2 has an inner radial surface facing towards the axis of the disc a-a that is shaped so as to follow the profile of the cylinders 15 foreseen in said attachment side elongated portion 2, for example forming recessed and projecting loops, for example with roughly sinusoidal extension.

Thanks to the fact that some or all of the radial surfaces of the attachment side elongated portions 2, and/or of the non-attachment side elongated portion 3 are shaped so as to follow the profile of the cylinders housed in them, it is possible to drastically reduce the thickness of said elongated portions 2, 3 and thus reduce the weight of the body of the caliper 1.

Thanks to the provision of the central bridges 6, 7 having outer surfaces 17, 18, diverging apart like a "V" it is possible to drastically limit the deformation of the body of the caliper during the braking actions in both directions of travel of the vehicle.

Thanks to the provision of a caliper body as described above, it is possible to obtain a structure that is particularly resistant to the high stresses generated by sudden braking, for example like those of racing vehicles.

At the same time, thanks to the characteristics of the caliper body described above, the caliper stressed with maximum braking will have an extremely reduced deformation that avoids undesired strokes of the brake pedal lever, giving the user the sensation of extremely good responsiveness of the braking system.

At the same time, thanks to the caliper body as described above, the overall weight of the caliper will be reduced.

For example, from a test carried out using a caliper made according to the state of the art compared with the solution described here, it emerged that by measuring the rigidity of the caliper body evaluated based on the amount of fluid that the caliper absorbs at the pressure of maximum use of the vehicle, the caliper shows an increased rigidity of 3-5% and even of 10-15% with respect to a caliper not equipped with central bridges, compared to a reduction in weight of about 9-11%.

Moreover, thanks to the caliper body as described above it is possible to substantially reduce the overall bulk for the same rigidity characteristics or for the same weight.

A man skilled in the art can bring modifications, adaptations and replacements of elements with others working in an equivalent manner to the embodiments of the device described above, in order to satisfy contingent requirements, without for this reason departing from the scope of the following claims. Each of the characteristics described as belonging to a possible embodiment can be made independently from the other described embodiments.

The invention claimed is:

1. A caliper body for a disc brake, suitable for being arranged astride of a disc for a disc brake,
   said disc having a first braking surface and a second braking surface opposite the first;
   said disc defining an axial direction (A-A) parallel to a rotation axis (a-a) thereof, a tangential or circumferential direction (T-T) parallel to one of its braking surfaces, with disc entry direction (I) and disc exit direction (U), and a radial direction (R-R) perpendicular to the axial direction (A-A) and to the circumferential or tangential direction (T-T), the latter defining an outer radial direction (RO) when facing away from the rotation axis of the disc;

said caliper body comprising:

an attachment side elongated portion equipped with at least one attachment portion suitable for being connected to a support for the caliper;

said attachment side elongated portion comprising a disc entry side first tangential end and a disc exit side second tangential end;

said attachment side elongated portion being suitable for facing with an axial inner surface thereof towards the first braking surface of the disc;

said attachment side elongated portion housing or forming at least one cylinder suitable for receiving a piston to exert pressure on at least one pad housed between said elongated portion of the caliper and said braking surface of the disc;

said body also comprising a non-attachment side elongated portion facing with an axial inner surface thereof towards the second braking surface of the disc and comprising a disc entry side first tangential end and a disc exit side second end;

said non-attachment side elongated portion housing or forming at least one cylinder suitable for receiving a piston to exert a pressure on at least one pad housed between said elongated portion of the caliper and said braking surface of the disc;

said elongated portions being connected together by a first end bridge that connects the two disc entry side tangential ends so that they cannot move with respect to one another, said bridge being suitable for being arranged astride of the disc;

said elongated portions being connected by a second end bridge that connects the two disc exit side tangential ends so that they cannot move with respect to one another, said second bridge being suitable for being arranged astride of the disc;

said caliper body also comprising two central bridges connecting the two elongated portions in their regions arranged inside the two end bridges; each of said central bridges comprising radial surfaces facing and opposite one another and lateral radial surfaces opposite one another that face towards the end bridges; said central bridges connecting the attachment side elongated portion to the non-attachment side elongated portion and having said opposite lateral radial surfaces facing towards the end bridges that, going from the attachment side elongated portion to the non-attachment side elongated portion move apart in a substantially "V-shaped" manner and said lateral radial surfaces are angled toward their respective end bridges and away from each other and with respect to the axial direction (A-A).

2. The caliper body of claim 1, wherein between the two central bridges there is a central window suitable for receiving an elastic element to influence the pads going away from the disc and abutting against an abutment surface.

3. The caliper body of claim 1, wherein at least one of said central bridges has a portion thereof close to the non-attachment side elongated element equipped with an undercut or groove to make it lighter.

4. The caliper body of claim 1, wherein said attachment side elongated portion in the radial direction has at least one portion that is lowered or of lower radial thickness with respect to the radial thickness of said attachment side elongated portion at the end bridge and/or the central bridges.

5. The caliper body of claim 1, wherein said attachment side elongated portion, between at least one end bridge and at least one central bridge, has at least two lowered or undercut portions forming portions of said attachment side elongated portion with reduced radial thickness with respect to the radial thickness at said end bridge and said central bridge.

6. The caliper body of claim 5, wherein between said two undercuts there is a column-shaped element that extends from said elongated portion in the outer radial direction provided at its free end with a seat to house a pad support pin.

7. The caliper body of claim 5, wherein said attachment side elongated portion has four undercuts or depressions that reduce the radial thickness of the elongated attachment portion with respect to the thickness of the elongated portion at the end bridges or the central bridges.

8. The caliper body of claim 5, wherein the non-attachment side elongated portion has its portion axially facing the section of the attachment side elongated portion equipped with at least one undercut section having greater radial thickness with respect to the radial thickness of the facing undercut section in the attachment side elongated portion.

9. The caliper body of claim 1, wherein the attachment side elongated portion has an upper surface facing radially outwards shaped following the profile of the cylinders that are made in it.

10. The caliper body of claim 1, wherein there are at least two attachment portions in the attachment side elongated portion of the caliper wherein two of the at least two attachment portions are arranged close to the central bridges.

11. The caliper body of claim 1, wherein said non-attachment side elongated portion has a radially upper surface facing in the outer radial direction equipped with a longitudinal groove or longitudinal undercut extending in the tangential direction, a base wall of which is shaped so as to follow the extension of the cylinders in said non-attachment side elongated portion.

12. The caliper body of claim 1, wherein said non-attachment side elongated portion has an inner radial surface facing towards the axis of the disc and shaped so as to follow the profile of the cylinders in said non-attachment side elongated portion.

13. The caliper body of claim 1, wherein, viewing the caliper body in the radial direction from the axis of the disc outwards, said two central bridges connecting the two elongated portions join to said attachment side elongated portion converging, with their opposite lateral radial surfaces facing towards the end bridges, into a protuberance that extends axially outside of the caliper body beyond said attachment side elongated element.

14. The caliper body of claim 1, wherein, looking the caliper body in the radial direction from the axis of the disc outwards, said two central bridges connecting the two elongated portions join to said attachment side elongated portion at the sides of the same cylinder, and/or between the same cylinder and two attachment portions close to said same cylinder.

15. The caliper body of claim 1, wherein said angle is an acute angle (AN) formed with respect to one same axial direction located between the two central bridges.

16. A caliper for a disc brake comprising a caliper body as described in claim 1.

* * * * *

UNITED STATES PATENT AND TRADEMARK OFFICE
CERTIFICATE OF CORRECTION

PATENT NO. : 8,701,841 B2  
APPLICATION NO. : 13/518442  
DATED : April 22, 2014  
INVENTOR(S) : Cristian Crippa et al.

Page 1 of 1

It is certified that error appears in the above-identified patent and that said Letters Patent is hereby corrected as shown below:

On the title page, item (75)  
First named Inventor should read: Cristian Crippa, Almenno San Bartolomeo, Bergamo (IT)  
Third Inventor should read: Massimo Preda, Ponte San Pietro, Bergamo (IT)

Signed and Sealed this  
Seventeenth Day of February, 2015

Michelle K. Lee  
*Deputy Director of the United States Patent and Trademark Office*